United States Patent [19]

Moroto et al.

[11] Patent Number: 4,602,525
[45] Date of Patent: Jul. 29, 1986

[54] CONTINUOUSLY VARIABLE SPEED TRANSMISSION FOR A VEHICLE HAVING A FORWARD-REVERSE CHANGEOVER MECHANISM

[75] Inventors: Shuzo Moroto; Shiro Sakakibara, both of Aichi, Japan

[73] Assignee: Aisin Warner Kabushiki Kaisha, Aichi, Japan

[21] Appl. No.: 604,959

[22] Filed: Apr. 27, 1984

[51] Int. Cl.$^4$ ............... F16H 37/00; F16H 37/08
[52] U.S. Cl. .................... 74/689; 74/695; 74/792; 74/788
[58] Field of Search ............ 74/792, 788, 695, 689

[56] References Cited

U.S. PATENT DOCUMENTS

| | | | |
|---|---|---|---|
| 2,933,952 | 4/1960 | Schon | 74/689 |
| 3,203,277 | 8/1965 | General | 74/689 |
| 3,375,734 | 4/1968 | Lemons | 74/689 |
| 3,479,908 | 11/1969 | Kress et al. | 74/689 X |
| 4,060,012 | 11/1977 | Giacosa | 74/689 |
| 4,392,394 | 7/1983 | Hofbauer et al. | 74/689 |
| 4,408,746 | 10/1983 | Marsch et al. | 74/792 X |
| 4,502,353 | 3/1985 | Beaudoin | 74/689 X |
| 4,548,099 | 10/1985 | Wayman et al. | 74/689 |
| 4,550,629 | 11/1985 | Kawamoto | 74/792 X |

Primary Examiner—Kenneth J. Dorner
Assistant Examiner—Dirk Wright
Attorney, Agent, or Firm—Koda and Androlia

[57] ABSTRACT

An automatic transmission for a vehicle including a fluid coupling, a belt type continuously-variable speed transmission (CVT), a planetary gear mechanism and a differential device. The planetary gear mechanism includes a first input shaft and a second input shaft, wherein when the first input shaft is connected to an output shaft of CVT through a clutch, a forward range gear train is formed; whereas when the second input shaft is connected to the output of CVT by the clutch, a reverse range gear train is formed. A low-high speed changeover mechanism including a brake is provided in the planetary gear mechanism, and a first element and a second element of the planetary gear mechanism are selectively held in a stationary position by means of the brake to selectively form the forward range high-speed gear train and forward range low-speed gear train. The clutch and the brake are provided with recesses in one part thereof and are provided with projections in the other part which are fitted into the recesses, and the dimension of the outside diameter thereof is reduced as compared with that of clutches or brakes of the wet multiple-disc type.

3 Claims, 6 Drawing Figures

CONTINUOUSLY VARIABLE SPEED TRANSMISSION FOR A VEHICLE HAVING A FORWARD-REVERSE CHANGEOVER MECHANISM

BACKGROUND OF THE INVENTION

The present invention relates to an automatic transmission for a vehicle which uses a belt type continuously-variable speed transmission system (hereinafter referred to as "CVT").

The CVT includes an input pulley, an output pulley and an endless belt extended between the pulleys. The input pulley and the output pulley each includes a fixed sheave secured to a rotational shaft and a movable sheave mounted movably in an axial direction of the rotational shaft by means of a servo motor, and the movable sheave can be displaced axially to thereby change the ratio of rotational speed of the output pulley relative to that of the input pulley in the range of approximately 0.5 to 2.0.

When the CVT is used as the transmission for a vehicle, a first rotational shaft having the input pulley of CVT mounted thereon is connected to an output shaft of an engine through a coupling means, and between a second rotational shaft having the output pulley of CVT mounted thereon and a differential device are provided with a planetary gear mechanism and a forward-reverse changeover mechanism. A low-high speed changeover mechanism is provided in the planetary gear mechanism, if necessary. Generally speaking, the forward-reverse changeover mechanism and the low-high speed changeover mechanism are necessary to provide with a clutch for connecting specific elements of the planetary gear mechanism or a brake adapted to connect a specific element of the planetary gear mechanism in a stationary position. However, when a wet multiple-disc type clutch or brake is employed as the aforementioned clutch or brake, it is difficult to load the transmission on a small automobile because the diameter of a frictional engaging element of said wet multiple-disc type clutch or brake is large, resulting in a large dimension of the whole transmission for a vehicle.

What is needed is an automatic transmission for a vehicle wherein a forward-reverse changeover gear mechanism or a low-high speed changeover gear mechanism, which is provided between the rotational shaft having the output pulley of CVT mounted thereon and a transmission output shaft for a vehicle, is miniaturized and light in weight.

SUMMARY OF THE INVENTION

Generally speaking, in accordance with the present invention, an automatic transmission for a vehicle especially suitable for a small size, front-engine front-drive automobile provided with a belt type continuously-variable speed transmission system (CVT) and a planetary gear mechanism, is provided. The CVT includes an input pulley mounted on a first shaft, an output pulley mounted on a second shaft and an endless belt extended between the input pulley and output pulley to transmit power, the first shaft being disposed coaxially with and coupled to an output shaft of a coupling means, and the second shaft being disposed parallel with the first shaft. The input pulley and output pulley each includes a fixed sheave and a movable sheave which is well known.

The planetary gear mechanism has its input shaft and output shaft disposed coaxially with the second shaft of the CVT and includes at least one forward speed range and one reverse range.

The planetary gear mechanism in accordance with the present invention includes a first input shaft, a second input shaft and an output shaft and is of the type in which the output shaft of the CVT is selectively connected to the first input shaft through a clutch to thereby establish the forward range whereas the output of the CVT is selectively connected to the second input shaft to thereby establish the reverse range. The clutch is in the form of a dog clutch.

According to the present invention, a low-high speed changeover mechanism is provided in the planetary gear mechanism. The low-high speed changeover mechanism includes a first and a second discs disposed perpendicularly to and rotatably with respect to a rotational axis of the output shaft of the planetary gear mechanism, a sleeve which is movable axially with respect to said rotational axis and non-rotatable with respect thereto, and a shift lever one end of which is engaged with the sleeve, the first and second discs being formed with splines and the sleeve being formed with splines selectively engageable with the splines formed on the first and second discs. When the sleeve is shifted by the shift lever to a position where the sleeve is selectively connected to the first disc, a gear train for establishing the forward range of the planetary gear mechanism is formed whereas when the sleeve is shifted by the shift lever to a position where the sleeve is selectively connected to the second disc, a gear train for establishing another forward range is formed.

Accordingly, it is a primary object of the present invention to provide an improved automatic transmission including a CVT and a planetary gear mechanism for a vehicle which automatic transmission is capable to establish a forward range gear train when a first input shaft of the planetary gear mechanism is selectively connected to an output shaft of the CVT by a clutch means and to establish a reverse range gear train when a second input shaft of the planetary gear train is selectively connected to the output shaft of the CVT by the clutch means.

An another object of the present invention is to provide an improved and compact automatic transmission including a CVT and a planetary gear mechanism for a vehicle which automatic transmission is capable to establish a forward range gear train when a first input shaft of the planetary gear mechanism is selectively connected to an output shaft of the CVT by means of a dog clutch means having a reduced diameter as compared with a wet multiple-disc type clutch means and to establish a reverse range gear train when a second input shaft of the planetary gear train is selectively connected to the output shaft of the CVT by means of a dog clutch means.

A further object of the present invention is to provide an improved automatic transmission including a CVT and a planetary gear mechanism for a vehicle which is capable to establish a forward range gear train when a first element of the planetary gear mechanism is selectively fixed in a stationary position by means of brake means and to establish another forward range gear train when a second element of the planetary gear train is selectively fixed in a stationary position by means of brake means.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
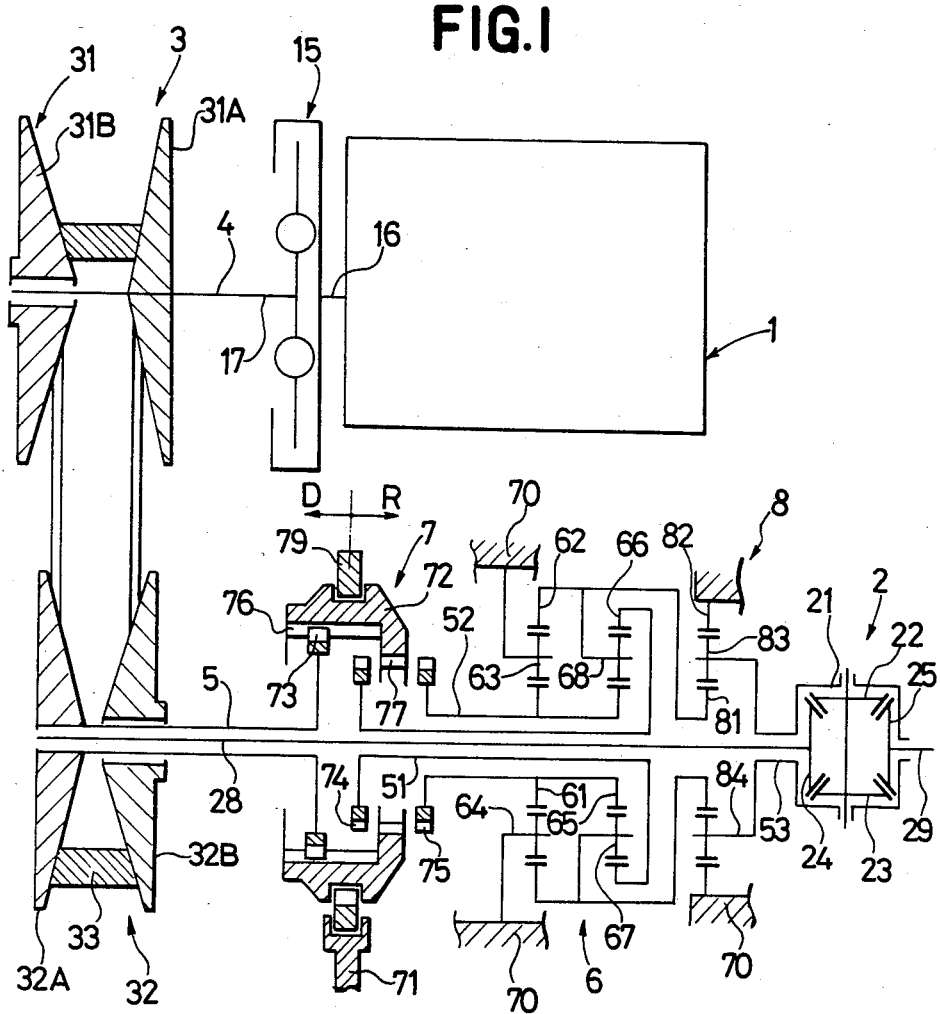
FIGS. 1 through 6 are respectively schematic sectional view showing different embodiments of the present invention.

FIG. 1 shows an embodiment in which the present invention is applied to an automatic transmission for a vehicle of the front-engine front-drive system. This automatic transmission comprises a coupling means 15, a belt type continuously-variable speed transmission system (CVT) 3, a planetary gear mechanism 6, a differential device 2 and a transmission housing 70 for accommodating these elements and fixedly mounted on an engine 1. The housing 70 is partially shown in FIG. 1.

The coupling means 15 is shown in the form of a fluid coupling including an input shaft 16 connected coaxially with an output shaft (not shown) of the engine 1 and an output shaft 17 disposed coaxially with the input shaft 16. Other automatic clutch means such as a torque converter, a centrifugal clutch, a magnetic clutch, etc. can be used in place of the fluid coupling 15.

The CVT 3 oomprises an input pulley 31 mounted on a first shaft 4, an output pulley 32 mounted on a second shaft 5, and an endless belt 33 extended between the pulleys 31 and 32 to transmit power. The pulleys 31, 32 each has fixed sheaves 31A, 32A secured to the shafts 4, 5, and movable sheaves 31B, 32B mounted slidably axially on the shafts 4, 5, respectively. Each of the movable sheaves 31B, 32B is operated by hydraulic servomotor mounted on the shafts 4, 5, respectively. The first shaft 4 is disposed coaxially with the output shaft 17 of the coupling means 15 and coupled thereto. The second shaft 5 is formed in the form of a tubular shaft, which rotational axis is arranged parallel with the rotational axis of the first shaft 4.

The planetary gear mechanism 6 includes a first input shaft 51, a second input shaft 52 and an output shaft 53, which are in the form of a tubular shaft, said shafts 51, 52 and 53 being arranged coaxially with the second shaft 5 of the CVT 3. The planetary gear mechanism 6 comprises two sets of planetary gear set and a reduction gear mechanism 8. The first planetary gear set comprises a first sun gear 61 concentrically secured to the second input shaft 52, a first ring gear 62 disposed concentrically with the sun gear 61, a first planetary gear 63 meshing with the sun gear 61 and ring gear 62 and a first planetary carrier 64 for rotatably supporting the planetary gear 63. The second planetary gear set comprises a second sun gear 65 concentrically secured to the second input shaft 52, a second ring gear 66 disposed concentrically with the sun gear 65, a second planetary gear 67 meshing with the sun gear 65 and ring gear 66 and a second planetary carrier 68 for rotatably supporting the planetary gear 67. The first planetary carrier 64 is connected to the housing 70 in the stationary state so that it may not be rotated with respect to the housing 70, the first ring gear 62 is connected to the second planetary carrier 68 and further connected to a sun gear 81 which also functions as an input gear of a reduction gear mechanism 8 which is hereinafter described, and the second ring gear 67 is connected to the first input shaft 51. It is noted that the first ring gear 62 can be directly connected to the output shaft 53 to omit the reduction gear mechanism 8.

The reduction gear mechanism 8 comprises a sun gear 81 disposed coaxially with the first and second sun gears 61, 65 of the planetary gear mechanism 6, a ring gear 82 disposed concentrically with the sun gear 81, a planetary gear 83 meshing with the sun gear 81 and ring gear 82 and a planetary carrier 84 for rotatably supporting the planetary gear 83. The sun gear 81 is connected to the first ring gear 62 and the second planetary carrier 68 of the planetary gear mechanism 6, the ring gear 82 is connected to the housing 70 in the stationary state in such a way that the ring gear 82 is not rotated with respect to the housing 70, and the planetary carrier 84 is concentrically connected to the output shaft 53. Thus, the reduction gear mechanism 8 functions as a part of the planetary gear mechanism 6.

The output shaft 53 of the planetary gear mechanism 6 is connected to a gear casing 21 of the differential device 2 concentrically with the rotational axis thereof. The differential device 2 comprises differential gears 22, 23 secured to a shaft supported on the casing 21 perpendicularly to the rotational axis of the casing 21, and output gears 24, 25 meshing with the gears 22, 23 and rotatably supported on the casing 21 with respect to the rotational axis of the casing 21. Said output gears 24, 25 each connects output shafts 28, 29, respectively, which is adapted for connection with an axle (not shown) used to drive front wheels.

The fluid coupling 15 and input pulley 31 of the CVT 3 are rotatably mounted on the housing 70 by means of the first shaft 4, and the output pulley 32 of the CVT 3, planetary gear mechanism 6 and differential device 2 are rotatably supported on the housing 70 by means of the second shaft 5 and output shaft 53.

A clutch 7 is formed between the output pulley 32 of the CVT 3 and the planetary gear mechanism 6. The clutch 7 includes splines 73 formed on the outer circumferential edge of an output end of the output shaft 5 of the CVT 3, splines 74, 75 formed on the outer circumferential edges of input ends of the first and second input shafts 51 and 52 of the planetary gear mechanism 6, respectively, a sleeve 72 which is disposed concentrically with and rotatable with respect to the rotational axis of the input shafts 51, 52 of the planetary gear mechanism 6 and is movable in the direction of said rotational axis, splines 76 formed on the inner circumference of the sleeve 72 and always engaging the splines 73 formed on the output shaft 5, splines 77 formed on the inner circumference of the sleeve 72 and selectively engageable with the splines 74 formed on the first input shaft 51, the splines 75 formed on the second input shaft 52, a shift ring 79 slidably engaged with a groove formed on the outer circumference of the sleeve 72, and a shift lever 71 one end of which engages the shift ring 79 and supported on the transmission housing 70. When the shift lever 71 is operated to move the sleeve 72 in a direction as indicated by the arrow D shown in FIG. 1 in the direction of the rotational axis, the splines 77 formed on the inner circumference of the sleeve 72 comes to mesh with the splines 74 formed on the first input shaft 51 to permit the first input shaft 51 to rotate integral with the output shaft 5 and allow the second input shaft 52 to rotate freely, and hence the forward range gear train is formed. When the sleeve 72 is moved axially in a direction as indicated by the arrow R shown in FIG. 1, the splines 77 comes to mesh with the splines 75 formed on the second input shaft 52 to permit the second input shaft 52 to rotate integral with the output shaft 5 and allow the first input shaft 52 to rotate freely, and hence the reverse range gear train is formed. The other end of the shift lever 71 projects beside the driver's seat of the vehicle.

The embodiment of the present invention shown in FIG. 1 operates as follows. The engine 1 of the vehicle is started and the shift lever 71 projected besides the driver's seat is positioned to the forward or reverse position to move the shift ring 79 by a driver. If the engine 1 is in the idling mode, engine torque generated by the engine 1 may not be transmitted to the input pulley 31 of the CVT 3 through the fluid coupling 15, and therefore, the sleeve 72 of the clutch 7 is readily spline-coupled with the first input shaft 51 or the second input shaft 52. Next, an accelerator pedal is pressed down by the driver, the engine torque is transmitted to the input pulley 31 of the CVT 3 by means of the fluid coupling 15 when the throttle opening of the engine exceeds a predetermined value, and the vehicle starts to move. As is known, the CVT 3 continuously varies the ratio of rotational speed between the input shaft 4 and output shaft 5. The torque transmitted to the output shaft 5 of the CVT 3 is transmitted to the front wheels through the planetary gear mechanism 6, differential device 2 and output shafts 28, 29.

In the above-described transmission, the clutch 7 disposed between the output shaft 5 of the CVT 3 and the input shafts 51, 52 of the planetary gear mechanism 6 is of the form of a dog clutch in which the splines 77 formed on the sleeve 72 is selectively engaged with the splines 74 formed on the first input shaft 51 and with the splines 75 formed on the second input shaft 52, and therefore, the dimension of outer configuration of the clutch 7 can be considerably reduced and the efficiency of transmission of torque from the output shaft 5 to the first input shaft 51 or second input shaft 52 is not decreased.

Figure 2:
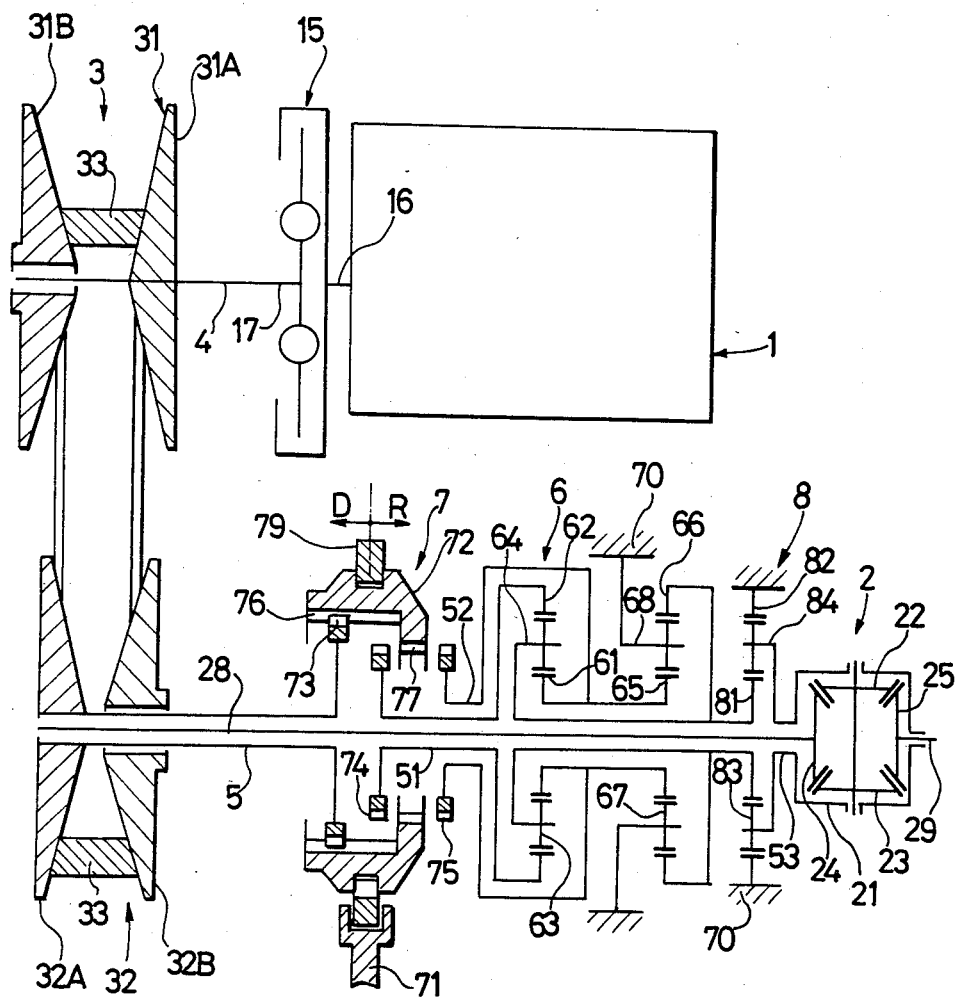

Another embodiment of the present invention shown in FIG. 2 is different from one shown in FIG. 1 in connecting means of two rows of planetary gear sets in the planetary mechanism 6, and thus there is a mere difference therebetween in final reduction ratio of the planetary gear mechanism 6 but remainders are the same as those shown in FIG. 1. Accordingly, explanations for the same parts as those of FIG. 1 will be omitted.

In FIG. 2, the first sun gear 61 and second sun gear 65 are connected to the second input shaft 52, the first ring gear 62 is connected to the first input shaft 51, the first planetary carrier 64 and second ring gear 66 are connected to the sun gear 81 of the reduction gear mechanism 8, and the second planetary carrier 68 is connected to the transmission housing 70 in the state wherein the carrier 68 is not rotatable with respect to the transmission housing 70.

The operation of this embodiment is the same as that of the embodiment shown in FIG. 1.

Figure 3:
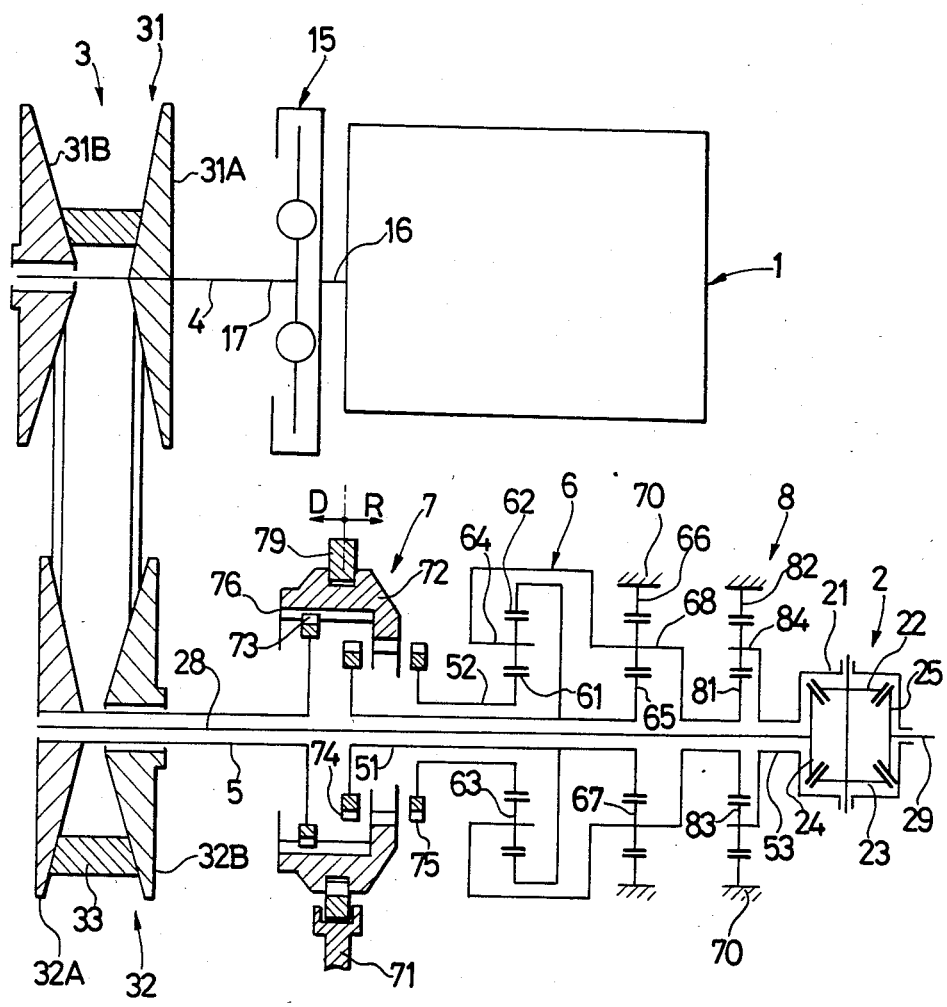

Another embodiment of the present invention shown in FIG. 3 is different from one shown in FIG. 1 in connecting means of two rows of planetary gear sets in the planetary mechanism 6, and thus there is a mere difference therebetween in final reduction ratio of the planetary gear mechanism 6 but remainders are the same as those shown in FIG. 1. Accordingly, explanations for the same parts as those of FIG. 1 will be omitted.

In FIG. 3, the first sun gear 61 is connected to the second input shaft 52, the first ring gear 62 and second sun gear 65 are connected to the first input shaft 51, the first planetary carrier 64 and second planetary carrier 68 are connected to the sun gear 81 of the reduction gear mechanism 8, and the second ring gear 66 is connected to the transmission housing 70 in the state wherein the ring gear 66 is not rotatable with respect to the transmission housing 70.

The operation of this embodiment is the same as that of the embodiment shown in FIG. 1.

Figure 4:
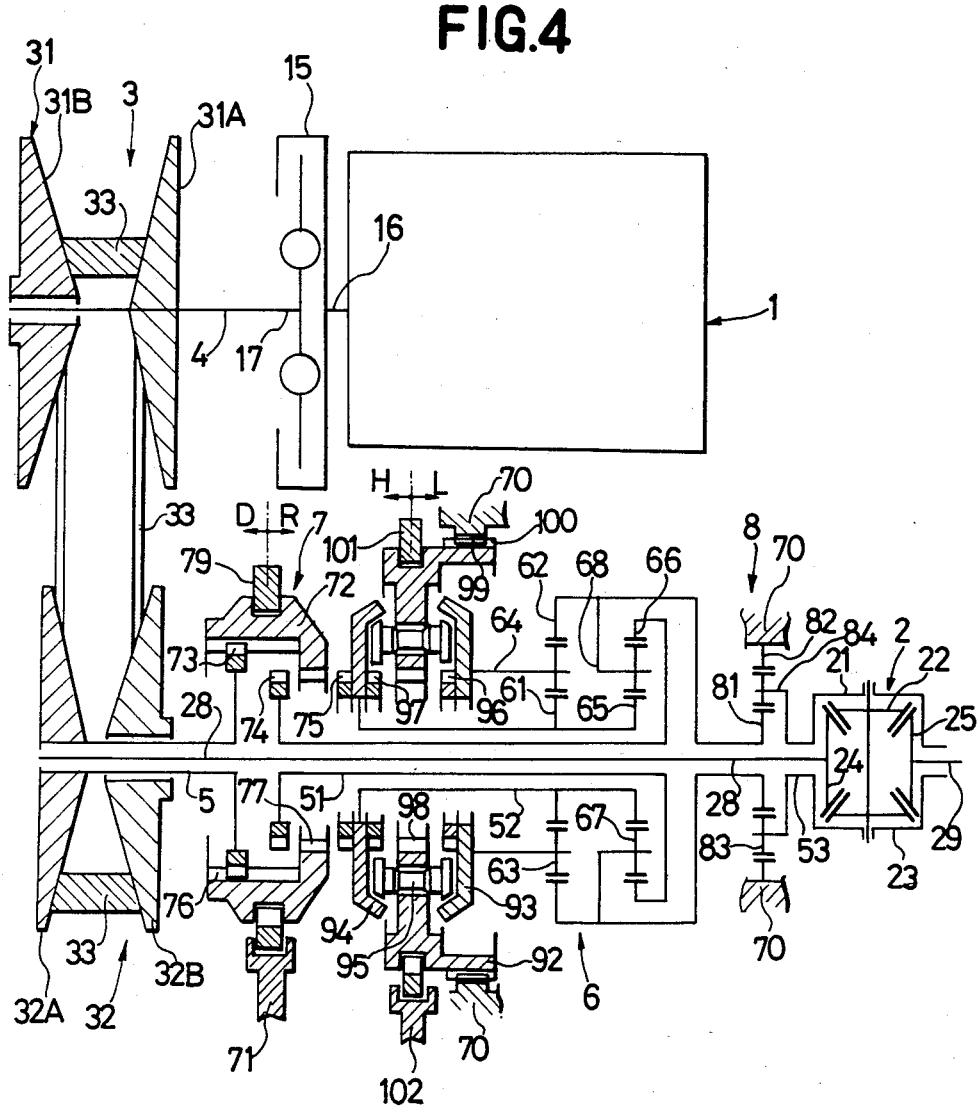

FIG. 4 shows an embodiment of the present invention in which a low-high speed changeover mechanism 6 is further provided in the planetary gear mechanism 9 in the automatic transmission for the vehicle shown in FIG. 1. Accordingly, explanations for the parts common to those of the embodiment shown in FIG. 1 will be omitted.

The low-high speed changeover mechanism 9 includes a first and a second discs 93, 94 formed on the inner circumferential edges thereof with splines 96, 97, respectively, a second sleeve 92 which is disposed concentrically with the rotational axis of the first and second input shafts 51 and 52 of the planetary gear mechanism 6 and movable along but non-rotatable with respect to the rotational axis of the input shafts 51, 52, and is formed on the inner circumference thereof with splines 98 selectively engaging the splines 96, 97 formed on said two discs 93, 94, respectively, and at least one guide pin 95 loosely supported on the sleeve 92. Each of the first and the second discs 93, 94 is rotatable concentrically with respect to the rotational axis of the input shafts 51, 52 and has a mean plane thereof in a plane vertical to the rotational axis of said first and second input shafts 51, 52. The first disc 93 is connected to the first planetary carrier 64 of the planetary gear mechanism 6 and is rotatable concentrically relative to the first and second input shafts 51 and 52, and the second disc 94 is connected to the second input shaft 52 for rotation concentrically and integrally therewith. The second sleeve 92 has a key 100 formed on the outer circumference thereof axially and integrally, said key is fitted into a groove 99 formed on the transmission housing 70, the second sleeve 92 is movable in the direction of the rotational axis of the input shafts 51 and 52 but non-rotatable with respect to the rotational axis. A shift ring 101 is fitted into a circumferential groove formed on the outer circumference of the second sleeve 92, one end of a shift lever 102 directly or indirectly associated with the shift lever 71 is engaged with the shift ring 101, and the second sleeve 92 is shifted in a direction of arrow L or H shown in FIG. 4 by means of the shift lever 102.

When the sleeve 92 is shifted in the direction as indicated by the arrow L, the splines 98 formed on the sleeve 92 comes to mesh with the splines 96 formed on the first disc 93 to connect the first planetary carrier 64 to the transmission housing 70 to hold the carrier 64 in a stationary position and allow the second disc 94 to be rotated freely thereby the forward range low-speed gear train which is the same as the gear train of the planetary gear mechanism 6 shown in FIG. 1 is formed. When the second sleeve 92 is shifted in the direction as indicated by the arrow H, the splines 98 formed in the sleeve 92 comes to mesh with the splines 97 formed on the second disc 94 to connect the second input shaft 52 to the transmission housing 70 to hold the first and second sun gears 61, 65 in a stationary position relative to the housing 70 and allow the first disc 93 to rotate freely thereby a forward range high-speed gear train is formed.

The guide pin 95 is disposed between opposed surfaces of the first and second discs 93 and 94 with the lengthwise direction thereof in parallel with the rotational axis of the first and second input shafts 51 and 52. When the sleeve 92 is shifted in the direction of arrow L or H, one end of the guide pin 95 comes to abut with either the first disc 93 or second disc 94 whereby the rotation of the disc is braked to stop thus facilitating the spline-coupling between the second sleeve 92 and the first disc 93 or the second disc 94.

The low-high speed changeover mechanism 9 has a reduced outer diameter thereof as compared with that of the wet multiple-disc brake, but the braking force to preclude the rotation of the first input shaft 51 or the second input shaft 52 and to hold the shaft in the stationary position with respect to the housing 70 by the spline-coupling is great as compared with that of said multiple-disc brake.

In the embodiment shown in FIG. 4, the changeover from the forward range low-speed gear train to the forward range high-speed train or the changeover from the forward range high-speed gear train to the forward range low-speed gear train is carried out by shifting the second sleeve 92 by means of the shift lever 102 and the shift ring 101. In this operation, one end of the guide pin 95 which is loosely supported on the second sleeve 92 comes into contact with the first disc 93 or the second disc 94 to brake and stop the rotation thereof, and thereafter, the splines 98 formed on the second sleeve 92 is engaged with the splines 96 formed on the first disc 93 or with the splines 97 formed on the second disc 94. Therefore, the engagement between these splines is extremely easily and positively effected.

Figure 5:
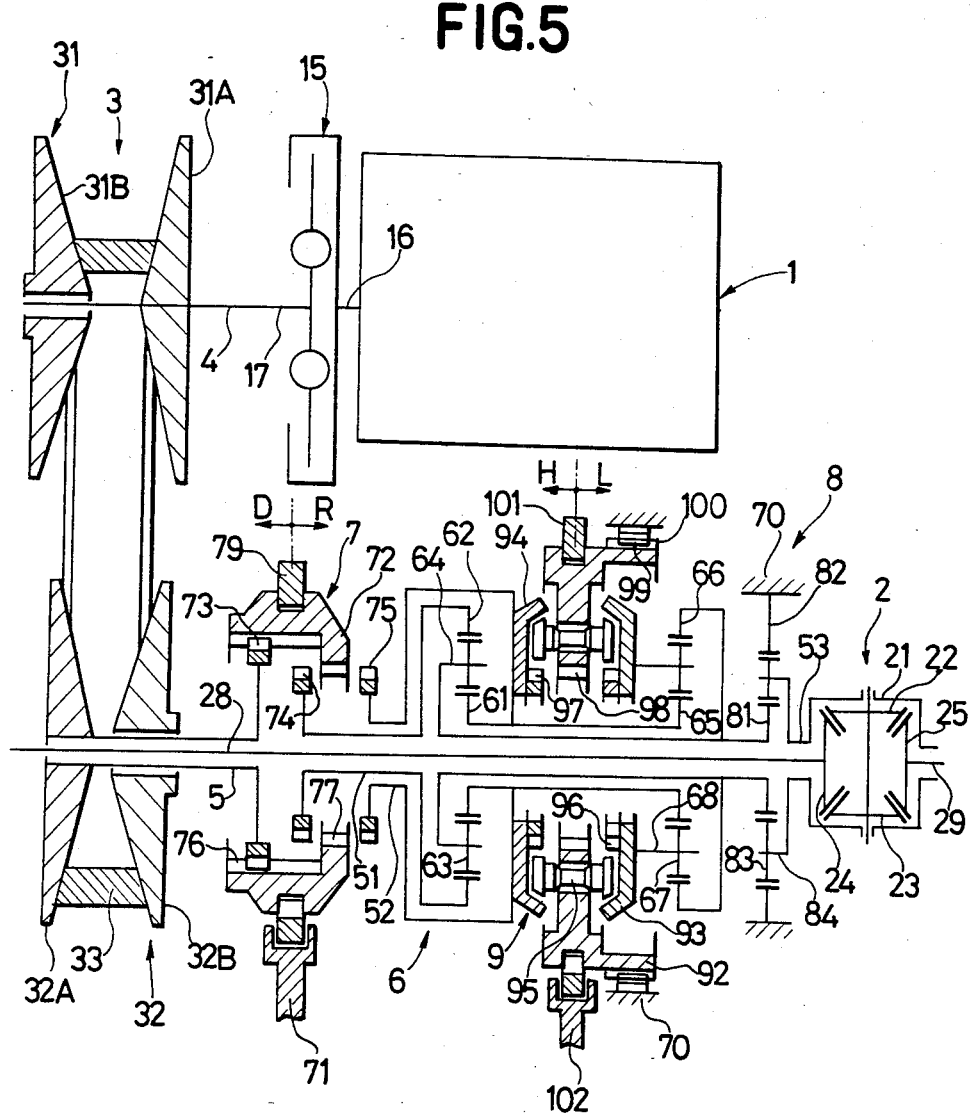

FIG. 5 shows another embodiment of the present invention in which a low-high speed changeover mechanism 9 is further provided in the planetary gear mechanism 6 in the automatic transmission for a vehicle shown in FIG. 2. This mechanism 9 comprises a first disc 93, a second disc 94, a second sleeve 92, a guide pin 95, a shift ring 101 and a shift lever 102, which are the same construction as that of the low-high speed changeover mechanism 9 described in connection with FIG. 4, said sleeve 92 having a key 100, which is axially formed on the outer circumference thereof, and is fitted into a groove 99 formed on the transmission housing 70. Accordingly, explanations for details of the mechanism 9 and parts common to those of the transmission shown in FIG. 2 will be omitted. In this embodiment, the low-high speed changeover mechanism 9 is disposed in the midst between the first planetary gear set and second planetary gear set of the planetary gear mechanism 6, the first disc 93 is connected to the second planetary carrier 68, the second disc 94 is connected to the second input shaft 52. Thus, when the second sleeve 92 is moved in the direction of arrow L shown in FIG. 5, the rotation of the first disc 93 is braked by action of the guide pin 95, the splines 98 formed on the sleeve 92 is engaged with the splines 96 formed on the first disc 93, and the first disc 93 is connected to the transmission housing 70 to hold the carrier 68 in a stationary position relative to the housing 70 thereby the forward range low-speed gear train similar to that shown in FIG. 2 is formed. When the second sleeve 92 is moved in the direction of arrow H shown in FIG. 5, the first disc 93 is freely rotated, the second disc 94 is braked by the second sleeve 92, and the second input shaft 52 is connected to the transmission housing 70 to hold the sun gears 61, 65 in a stationary position relative to the housing 70 thereby the forward range high-speed gear train is formed.

Figure 6:
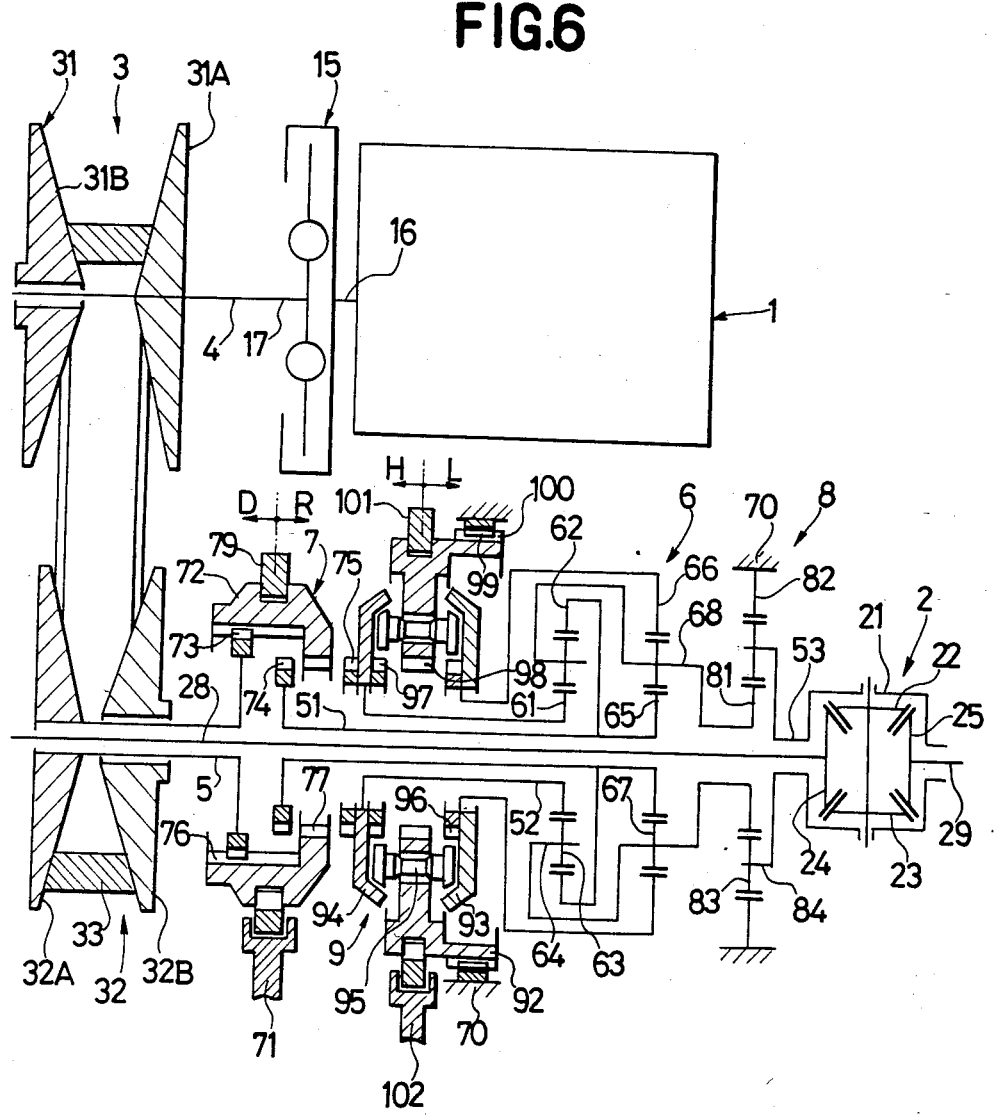

FIG. 6 shows another embodiment of the present invention in which a low-high speed changeover mechanism is further provided in the planetary gear mechanism 6 in the automatic transmission for a vehicle shown in FIG. 3. This mechanism includes a first disc 93, a second disc 94, a second sleeve 92, a guide pin 95, a shift ring 101 and a shift lever 102, which are the same construction as that of the low-high speed changeover mechanism 9 described in connection with FIG. 4, said sleeve 92 having a key 100, which is axially formed on the outer circumference thereof, fitted into a groove 99 formed on the transmission housing 70. Accordingly, explanations for details of the mechanism 9 and parts common to those of the transmission shown in FIG. 3 will be omitted. In this embodiment, the low-high speed changeover mechanism 9 is disposed between the clutch 7 and the planetary gear mechanism 6 similarly to the transmission shown in FIG. 4, the first disc 93 is connected concentrically with the second ring gear 66 of the planetary gear mechanism 6, the second disc 94 is connected concentrically with the second input shaft 52 of the planetary gear mechanism 6. Thus, when the second sleeve 92 is moved in the direction of arrow L shown in FIG. 6, the rotation of the first disc 93 is braked by action of the guide pin 95, the splines 98 formed on the second sleeve 92 is engaged with the splines 96 formed on the first disc 93, and the first disc 93 and second ring gear 67 is connected to the transmission housing 70 to hold the ring gear 66 in a stationary position relative to the housing 70 thereby the forward low-speed gear train similar to that shown in FIG. 3 is formed. When the second sleeve 92 is moved in the direction of arrow H shown in FIG. 5, the first disc 93 is freely rotated, the second disc 94 is braked by the second sleeve 92, and the second input shaft 52 is connected to the transmission housing 70 to hold the ring gear 62 and sun gear 65 in a stationary position relative to the housing 70 thereby the forward range high-speed gear train is formed.

What is claimed is:

1. A continuously-variable speed transmission for a vehicle having a forward-reverse changeover mechanism, comprising:

a housing;

a coupling means having an input shaft and output shaft;

a belt type continuously-variable speed transmission system having an input pulley mounted coaxially on a first shaft, and output pulley mounted coaxially on a second shaft and a belt extending between said first and second pulleys to transfer power, each of said first and second pulleys having a fixed sheave and a movable sheave, said first shaft being disposed coaxially with and rotatably coupled with said output shaft of said coupling means, said second shaft being disposed side by side and in parallel with said first shaft;

a planetary gear mechanism having a first input shaft, a second input shaft and an output shaft, each of said input shafts and said output shaft being disposed concentrically with each other and coaxially with and rotatably with respect to the rotational axis of said second shaft of said belt type continuously-variable speed transmission system, each of said first and second input shafts having splines on the input end thereof, said planetary gear mechanism comprising at least two planetary gear sets in which an element of one of said planetary gear set being connected to said housing for establishing reverse rotation of said output shaft and including at least a forward range gear train using said first input shaft as an input shaft of said gear train and a reverse range gear train using said second input shaft as an input shaft of said gear train; and a clutch means having a one and single sleeve disposed coaxially, slidably with and rotationally linked to said second shaft of said belt type continuously-variable speed transmission system and a shift lever being engaged with said sleeve at one end thereof, said sleeve having splines thereon adapted to selectively mesh with said splines formed on said first and second input shafts, said shift lever being adapted to shift said sleeve between a first position where said sleeve is selectively connected to said first input shaft to establish said forward range gear train and a second position where said sleeve is selectively connected to said second input shaft to establish said reverse range gear train.

2. An automatic transmission as claimed in claim 1, and further comprising a low-high speed changeover mechanism having a first and second discs disposed perpendicularly to and rotatably with respect to the rotational axis of said output shaft of said planetary gear mechanism, respectively, a second sleeve disposed coaxially with and slidably but not rotatably with respect to the rotational axis of said output shaft of said planetary gear mechanism and a shift lever being engaged with said second sleeve at one end thereof, said first disc being linked to a first element of said planetary gear mechanism and having splines thereon, said second disc being linked to a second element of said planetary gear mechanism and having splines thereon, said second sleeve having splines thereof adapted to selectively mesh with splines formed on said first and second discs, said shift lever being adapted to shift said second sleeve between a position where said second sleeve is connected with said first disc for holding said first element of said planetary gear mechanism in a stationary position to establish said forward range gear train and a position where said sleeve is connected with said second disc for holding said second element of said planetary gear mechanism in a stationary position to establish another forward range gear train.

3. An automatic transmission as claimed in claim 2, wherein said low-high speed changeover mechanism further includes at least a guide pin disposed between said first and second discs in a direction parallel with the rotational axis of said output shaft of said planetary gear mechanism and being loosely supported on said second sleeve whereby said guide pin contacts selectively with one of said first and second discs for synchronizing the rotational speed of said disc and said sleeve when said second sleeve is shifted to one of said two positions.

* * * * *